Feb. 22, 1944.　　　V. KINSER　　　2,342,149
VARIABLE SPEED TRANSMISSION
Filed Oct. 16, 1942　　2 Sheets-Sheet 2
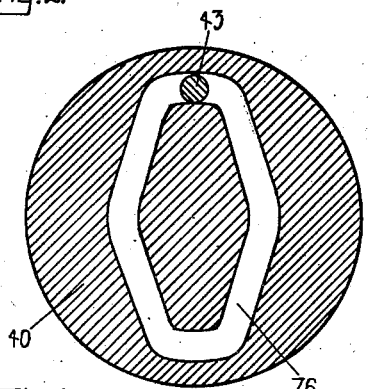
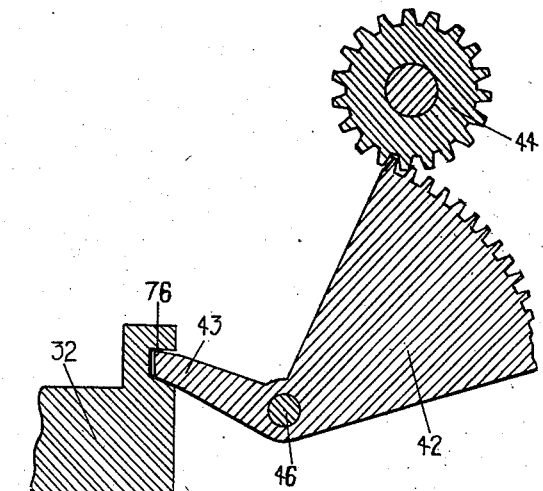
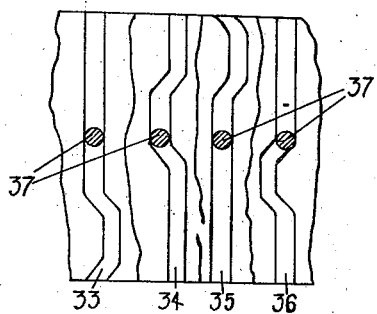
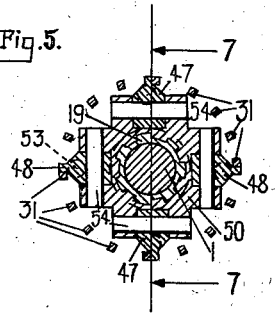
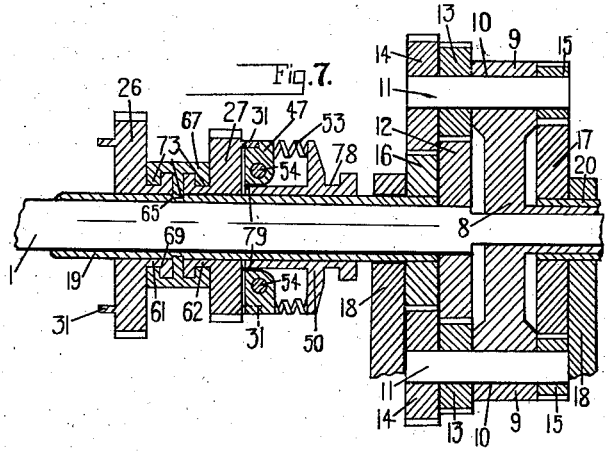
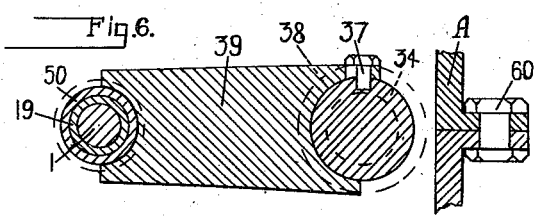
Inventor
Vernon Kinser Patented Feb. 22, 1944

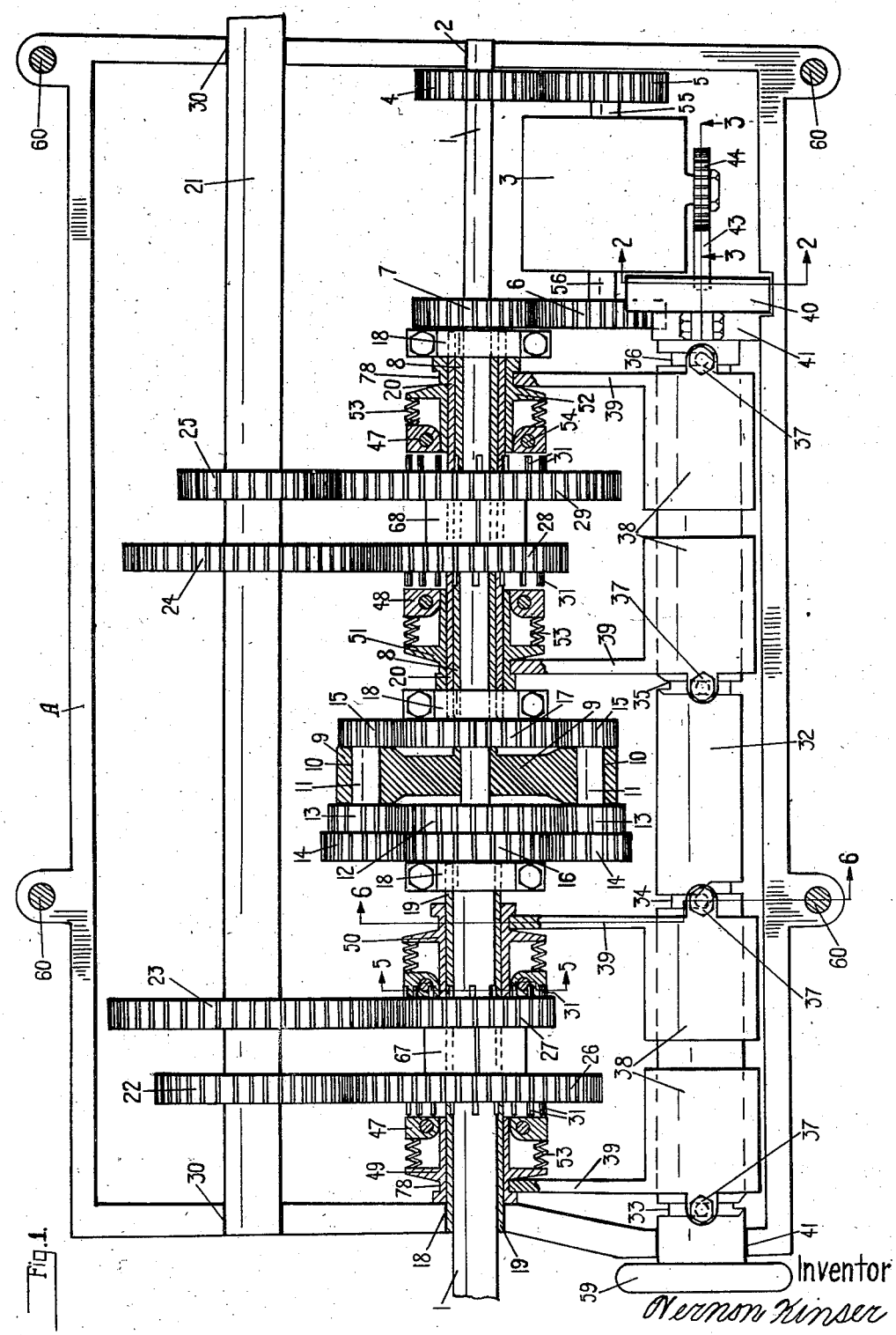

2,342,149

UNITED STATES PATENT OFFICE 2,342,149

VARIABLE SPEED TRANSMISSION

Vernon Kinser, Butterfield, Mo.

Application October 16, 1942, Serial No. 462,243

5 Claims. (Cl. 74—283)

This invention relates generally to speed transmission and has more particular reference to speed transmissions of variable type.

My invention has for its prime objects the provision of a transmission having substantially continuously variable speed transmission ratios between predetermined limits; the provision, in such apparatus, of means whereby the speed changing elements operate repeatedly between their speed changing limits, carrying greatly reduced torque, to effect the desired over-all speed changes; the provision of speed changing mechanism, of the kind described, in which torque-transmission is effected to a large extent by gears or other positive drives instead of the usual frictional drives, and, in general, to improve the construction of transmissions adapted especially, though not exclusively, for industrial application.

And with the above and other objects in view, my invention resides in the novel features of form, construction, arrangement, and combination of parts hereinafter described and pointed out in the claims.

In the accompanying drawings,

Figure 1 is a longitudinal sectional view through a variable speed transmission of my invention;

Figure 2 is a sectional view of the cam 46, taken approximately along the line 2—2, Figure 1;

Figure 3 is a sectional view of the segmentary gear 42, taken approximately along the line 3—3, Figure 1;

Figure 4 is a view taken along the circumference of the grooves 33, 34, 35, 36 showing a full 360 degrees;

Figure 5 is a sectional view showing the pairs of clutching dogs 47, 48 in clutching engagement, taken approximately along the line 5—5, Figure 1;

Figure 6 is a sectional view taken approximately along the line 6—6, Figure 1; and Figure 7 is a sectional view taken approximately along the line 7—7, Figure 5.

Referring now more in detail and by reference characters to the drawings, which illustrate a preferred embodiment of my invention, 1 designates the drive shaft of the device, being rigidly affixed to a sun gear 12 and likewise rigidly affixed to the gear 4 which is in mesh with the gear 5. The drive shaft 1 is supported on one end by the bearing 2 provided in the housing A of the transmission.

Power is transmitted from the gear 4 to the gear 7, preferably, as in this instance, by means of any type of continuously variable speed transmission made up and sold under various trade names and having various features of construction. The gears 4, 5 transmit power to the constant speed shaft 55 of the variable speed transmission 3, the output shaft 56 being connected to sleeve 8 by means of the gears 6, 7 in any suitable manner. So it will be noted; torque is transmitted from the drive-shaft 1 to the sleeve 8 at variable ratios determined by the variable speed transmission 3, best seen in Figure 1.

The sleeve 8 embraces the drive shaft 1 and on one end is provided with a pair of radially extending arms 9 in each of which is the bore 10. Revolvably mounted in the bores 10 are the shafts 11, upon each of which is rigidly affixed a planetary pinion 13, disposed for meshing engagement with the sun gear 12.

Rigidly affixed on the respective ends of the shafts 11 are the planetary pinions 14, 15 disposed for meshing engagement respectively with the gears 16, 17 which are rigidly affixed to the revolvable members or sleeves 19, 20 for respective operative engagement of the sleeves 19, 20 by and with the planetary pinions, 14, 15, all of which is best seen in Figure 1.

Referring, again, to Figure 1 it will be noted that the planetary pinions 14 are larger than the planetary pinions 13, and, that the planetary pinions 15 are smaller than the planetary pinions 13. Upon rotation of the sleeve 8 in either direction with respect to the drive shaft 1, the sleeve 20 will rotate at a speed intermediate with respect to the drive shaft 1 and the sleeve 8, since the planetary pinions 13, 15 are disposed to rotate at the same speeds with respect to each other, and, because of the difference in size of planetary pinions 13, 15 the sleeve 20 must rotate at a speed nearer the same speed of the sleeve 8 than the drive shaft 1.

Such an intermediate speed of the sleeve 19, however, will not be effected, instead, the drive shaft 1 will be caused to rotate at a speed intermediate with respect to the sleeves 19, 8, since the planetary pinions 13 are smaller than the planetary pinions 14 and the drive shaft 1 must rotate at a speed nearer the same speed of the sleeve 8 than the sleeve 19. So, it will be understood, because of these intermediate speeds of the sleeve 20 and the drive shaft 1, rotation of the sleeve 8 on the drive shaft 1 will cause the sleeves 19, 20 to be driven in reverse directions with respect to the drive shaft 1 or each other. The planetary pinions 13, 14, 15, therefore, serve as means for reversing the direction of speed change of the sleeves 19, 20 with respect to each other to speed changes by the variable speed transmission 3, for purposes soon to appear.

Revolvably mounted upon the sleeve 19 is the pair of gears 26, 27 being provided respectively with the hubs 61, 62, in each of which is a circumferential groove as 69. Interposed between the gears 26, 27 is the snap ring member 67, provided with three inwardly extending flanges 73 disposed for association with the grooves 69 and the groove 65 provided on the sleeve 19 so that the gears 26, 27 will be held against axial movement, best seen in Figure 7. In a like manner the gears 28, 29 are mounted on the sleeve 20 and are adapted to cooperate with a snap ring as 68 so that the gears 28, 29 will be held against axial movement on the sleeve 20.

For rotarily supporting the sleeves 19, 20 by the housing A there is provided the bearings 18 suitably arranged at the ends of the sleeves 19, 20. The housing A is split so as to facilitate assembly of the parts and is provided with a suitable number of fastening elements or bolts 60, the split in the housing A being arranged so as to provide accessibility to the bearings 2, 30, 41, best seen in Figure 1.

Meshing respectively with the gears 26, 27, 28, 29 is the cooperating gears 22, 23, 24, 25 being rigidly affixed on the driven shaft 21 which is revolvably mounted in the housing A, as by the bearings 30. It may be well to here say that the gear 26, 27, 28, 29 are arranged progressively in size in the order of 27, 28, 26, 29 the amount of step in speed between the respective gears corresponding to the difference in speed of the sleeves 19, 20 at the respective limits of speed change of the variable speed transmission 3. It should be noted, also, that the respective gears 26, 27, 28, 29 are arranged to progress in size so that no two gears next in order of progress with respect to each other will be on the same sleeve either 19 or 20, for purposes soon to appear.

Each of the gears 26, 27, 28, 29 is provided with an axially extending set of teeth 31. Disposed for respective operative engagement with each set of teeth 31 are the pairs of clutching dogs 47, 48, in each case, being respectively swingably connected to the shifting collars 49, 50, 51, 52 as by the pins 54. The shifting collars 49, 50 are splined to the sleeve 19 against independent rotation and so as to be slidable axially. In a like manner the shifting collars 51, 52 are splined to the sleeve 20 against independent rotation.

The clutching dogs 47, 48 are, in each case, suitably formed so as to provide stops as at 79. Disposed between the shifting collars 49, 50, 51, 52 and the clutching dogs 47, 48 are the springs 53, for urging the latter outwardly so as to be disposed for shifting in and out of clutching engagement with the teeth 31, as best seen in Figures 1, 7. Referring to Figure 5 it will be noted that the teeth 31 are spaced so that each space between the teeth 31 will be three times the width of any one of the clutching dogs 47, 48 at point of engagement.

The clutching dogs 47, 48 are circumferentially disposed with respect to each other so that when they are urged into engagement with the teeth 31 either the clutching dogs 47 or 48 will fall between the teeth 31 for driving engagement therewith, and, are further disposed circumferentially with respect to each other so that when either the dogs 47 and 48 are caused to rotate in either direction for driving engagement with the teeth 31 that the other pair of clutching dogs 47 or 48 will, then, be permitted to fall between the teeth 31 for driving engagement therewith.

Mounted revolvably in the housing A is the cam shaft 32, on one end of which is provided the control wheel 59. Disposed upon the cam shaft 32 are the four sleeves 38. Each of the sleeves 38 is provided with a threaded member or bolt as 37 and each terminate in an outwardly extending arm 39 which later embrace the respective grooves 78 provided in the shifting collars 49, 50, 51, 52, respectively, so that sliding movement of the sleeves 38 on the cam shaft 32 will be imparted to the shifting collars, 49, 50, 51, 52 as the case may be.

Disposed in the periphery of the cam shaft 32 are the grooves 33, 34, 35, 36 into each of which is respectively fit the inner end of the bolts 37, so that the grooves 33, 34, 35, 36 will cause the sleeves 38 to be shifted axially whenever the cam shaft 32 is caused to be rotated in either direction.

The shifting collars 49, 50, 51, 52, are caused to be shifted for clutching engagement of the clutching dogs 47, 48 with the teeth 31, for intervals of clutching engagement of the gears 26, 27, 28, 29 in the same order as they progress in size whenever the cam shaft 32 is rotated, for, it will be noted, referring to Figure 4, the groove 34 is disposed to hold the shifting collar 50 for clutching engagement of the dogs 47, 48 with the teeth 31 of the gear 27 for driving engagement between the gear 27 and the sleeve 19. Then, upon rotation of the cam shaft 32 in a clockwise direction, the groove 35 will cause the shifting collar 51 to shift the clutching dogs 47, 48 into clutching engagement with the gear 28 for driving engagement between the gear 28 and the sleeve 20, the shifting collar 50 being shifted for disengagement of the dogs 47, 48 from the teeth 31 of the gear 27.

In a similar manner the shifting collars 49, 52, in turn, are shifted for engagement and disengagement of the clutching dogs 47, 48 with the teeth 31. It should be noted in this respect, also, that the shifting collars 49, 50, 51, 52 are operated at intervals so that driving engagement from the sleeves 19, 20 is alternated.

The cam shaft 32 on its one end terminates in a disk like cam 40, having a groove 76 disposed with a profile suitable for operative engagement with the end of the arm 43 which extends from a segmentary gear member 42. The segmentary gear member 42 is pivotally mounted as on the trunnion 46, and is mounted for meshing engagement with the control wheel 44 which is provided to control the speed of the out-put shaft 56 of the variable speed transmission 3, as is the usual practice.

The output speed of the variable speed transmission 3 is controlled by the cam shaft 32, for, rotation of the cam shaft 32 will cause the arm 43 to move in the circumference of the groove 76 the arm 43 will be caused to oscillate and the control wheel will be turned for changing the output speed of the variable speed transmission 3. The speed changes, in this instance, amounting to, in a complete revolution of the cam shaft 32, four complete changes between the limits of the variable speed transmission 3, as best seen in Figure 2.

It may be well to say that these four complete changes of the variable speed transmission 3 occur during the respective intervals in which the gears 26, 27, 28, 29 are caused to be clutched into driving engagement with the sleeve 19 or 20, and, the steps in speed change between the gears 26, 27, 28, 29 being equal to the span of speed change of the variable speed transmission 3, as has been explained, permits the gears 26, 27, 28, 29 to be clutched into and out of engagement with the sleeve 19 or 20 while there is substantially no movement therebetween. The direction of speed change of the variable speed transmission 3 is suitable for this purpose.

The transmission is susceptible to many and varied applications. Particularly, however, it is highly adapted to be employed in connection with machine tool drives and other similar application in the industrial field, the drive shaft 1 being connected to a motor or any suitable driving spindle and the driven shaft 21 being connected to the tool or machine being driven in any suitable manner.

Let it be supposed, that, as in usual applications, the drive shaft 1 is connected to a motor and the driven shaft 21 is connected for operation of some tool or machine, as the case may be. Referring to Figures 1 and 4 it will be noted that the gear 27 is connected to the sleeve 19 for driving engagement therebetween, as has been explained. So, under these conditions the torque is transmitted from drive shaft 1 through the gear 12 and through the variable speed transmission 3 to the planetary gears 13, 14 and, hence to the sleeve 19, so that torque is transmitted from the drive shaft 1 to the driven shaft 21 at ratios determined by variable speed transmission 3 and the gears 27, 23.

Now, let it be supposed that it should become necessary to increase the speed of the driven shaft 21, whereupon, the control wheel 59 will be turned, necessarily, in a clockwise direction. This clockwise direction of rotation causes the cam 40 to operate the control wheel 44 to change the speed of the output shaft 56 from a maximum speed to a minimum speed by the time the control wheel 59 has turned one quarter revolution, best seen in Figure 2.

This change in speed of the output shaft 56 from maximum to minimum speeds, which in this instance is from two times speed of drive shaft 1 to one half speed of drive shaft 1, will result, then, in an increase in speed of the gear 27, and, thus the driven shaft 21, since the drive shaft 1 must rotate at a speed intermediate with respect to the sleeves 8, 19, as has been explained. With the output shaft 56 and, thus, the sleeve 8 rotating at a maximum speed or faster than the drive shaft 1, the sleeve 19 will be caused to rotate at a minimum speed or slower than the drive shaft 1. Upon a change in the speed of the sleeve 8 to a minimum speed or slower than the drive shaft 1, rotation of the sleeve 19 will be at a maximum speed or faster than the drive shaft 1.

During this interval of quarter turn of the control wheel 59, there has been affected a substantial speed change between the drive shaft 1 and the driven shaft 21. Further rotation of the control wheel 59 will cause the grooves 34, 35 to shift the shifting collars 50, 51 for disengagement of the clutching dogs 47, 48 from the gear 27 and for engagement of the clutching dogs 47, 48 with the gear 26, it being noted that the sleeve 20 will be rotating at its minimum speed while the sleeve 19 is rotating at maximum speed, and, due to the difference in speed of the gears 27, 28 causes the clutching engagement of the gear 26 with the sleeve 20 to be effected while they are at substantially the same speed.

Then, rotation of the control wheel 59 another quarter turn with the sleeve 20 connected to the gear 28, for this interval, while the variable speed transmission 3 is being changed from a minimum to a maximum speed, another substantial increase in speed of the driven shaft 21 is had since the planetary pinions 15 are smaller than the planetary pinions 13.

At this position, with the gear 26 and the sleeve 20 rotating at approximately the same speed, at one half turn of the control wheel 59, the grooves 33, 35 cause a shifting of the clutching dogs 47, 48 for clutching engagement with the gear 26 and for disengagement from the gear 28. Whereupon the next interval of rotation of the control wheel 59 a quarter turn will cause the variable speed transmission 3, to change from a maximum speed to a minimum speed, and because of the reversal in the planetary pinions 13, 14 the driven shaft 21 will again be increased in speed.

After this position of three quarters turn of the control wheel 59 has been reached, through the interval of operation of the gear 26, the grooves 33, 36 cause the clutching dogs 47, 48 to become engaged with the gear 29 for clutching engagement between the sleeve 20 and the gear 29 and the dogs 47, 48 to become disengaged from the gear 26. The variable speed transmission 3 again is caused to be changed from minimum output speed to maximum speed output. This maximum speed limit of the variable speed transmission 3 which is reached after a full turn of the control wheel 59, thus transmitted to the gear 29 in clutching engagement with the sleeve 20 is the maximum speed of the driven shaft 21 possible to attain.

Thus it will be seen my invention accomplishes its object. The variable speed transmission 3 operates repeatedly between its speed changing limits to give the desired over all speed change. The torque is to a large extent carried by gears instead of the usual friction drives which have always heretofore been required.

Changes and modifications in the form, construction, arrangement, and combination of the several parts of the variable speed transmission may be made and substituted for those herein shown and described without departing from the nature and principles of my invention.

Having thus described my invention, what I claim and desire to secure by Letters Patent is,

1. In a variable speed transmission of the kind described, in combination, a drive shaft, a driven shaft, a pair of sleeves revolvably mounted on said drive shaft, variable speed means connected for driving said sleeves by and with said drive shaft and, and for reversing the direction of speed change of said sleeves with respect to each other, a plurality of gears mounted on each of said sleeves, said gears arranged to progress in size and so that no two gears next in order of progress will be mounted on same sleeve, cooperating gears rigidly mounted on said driven shaft and in meshing engagement with said first named gears, clutches, one for each of said first named gears, for cooperation with the sleeve upon which the gear is mounted, and controlling means adapted both to regulate the speed of said variable speed means repeatedly between its speed changing limits and to operate said clutches for intervals of operation of said first named gears in the same order as they progress in size.

2. In a variable speed transmission of the kind described, in combination, a drive shaft, a driven shaft, a pair of sleeves revolvably mounted on said drive shaft, a gear wheel affixed to said drive shaft, a pair of gear wheels affixed to said sleeves respectively, a revolvable member coaxial with said drive shaft and, carrying a series of planetary pinions for meshing engagement with said gear wheel, a second series of planetary pinions larger than said first named planetary pinions for meshing engagement with one of said pair of gear wheels, a third series of planetary pinions smaller than said first named series of planetary pinions for meshing engagement with the other of said pair of gear wheels, said first named series of planetary pinions and said second and third series of planetary pinions all affixed to the same shafts and carried by said revolvable members, variable speed means connected for driving said revolvable member by and with said drive shaft, a plurality of gears mounted on each of said sleeves, said gears arranged to progress in size and so that no two gears next in order of progress will be mounted on the same sleeve, cooperating gears rigidly mounted on said driven shaft and in meshing engagement with said first named gears, clutches, one for each of said first named gears, for cooperation with the sleeve upon which the gear is mounted, and controlling means adapted both to regulate the speed of said variable speed means repeatedly between its speed changing limits and to operate said clutches for intervals of operation of said first named gears in the same order as they progress in size.

3. In a variable speed transmission of the kind described, in combination, a drive shaft, a driven shaft, a pair of sleeves revolvably mounted on said drive shaft, variable speed means connected for driving said sleeves by and with said drive shaft and, for reversing the direction of speed change of said sleeves with respect to each other, a plurality of gears mounted on each of said sleeves, said gears arranged to progress in size and so that no two gears next in order of progress will be mounted on same sleeve, cooperating gears rigidly mounted on said driven shaft and in meshing engagement with said first named gears, each of said first named gears provided with a set of teeth, two pairs of clutching dogs for engagement with each set of teeth, shifting means connected to said dogs, said sets of teeth spaced three times the width of one of said dogs apart, said pairs of clutching dogs circumferentially disposed with respect to each other so that at least one pair will be disposed for shifting into operative engagement with said teeth, yieldable means disposed between said shifting means and said clutching dogs to permit only one pair of said clutching dogs at a time to come into operative engagement with said teeth, and controlling means adapted both to regulate the speed of said variable speed means repeatedly between its speed changing limits and to operate said shifting means for clutching engagement of said clutching dogs with said sets of teeth for intervals of operation of said first named gears in the same order as they progress in size.

4. In a variable speed transmission of the kind described, in combination, a drive shaft, a driven shaft, a pair of sleeves revolvably mounted on said drive shaft, variable speed means connected for driving said sleeves by and with said drive shaft and, for reversing the direction of speed change of said sleeves with respect to each other, a plurality of gears mounted on each of said sleeves, said gears arranged to progress in size and so that no two gears next in order of progress will be mounted on same sleeve, cooperating gears rigidly mounted on said driven shaft and in meshing engagement with said first named gears, clutches, one for each of said first named gears, for cooperation with the sleeve upon which the gear is mounted, and controlling means adapted both to operate said clutches for intervals of operation of said first named gears in the same order as they progress in size and to regulate the speed of said variable speed means between its complete limits during each of said intervals.

5. In a variable speed transmission of the kind described, in combination, a drive shaft, a driven shaft, first and second revolvable members, variable speed means connected for driving said first and second revolvable members by and with one of said shafts and, for reversing the direction of speed change of said revolvable members with respect to each other, a plurality of gears mounted on each of said revolvable members, said gears arranged to progress in size and so that no two gears next in order of progress will be mounted on same revolvable member, cooperating gears rigidly mounted on the other of said shafts and in meshing engagement with said first named gears, clutches, one for each of said first named gears, for cooperation with the revolvable member upon which the gear is mounted, and controlling means adapted both to operate said clutches for intervals of operation of said first named gears in the same order as they progress in size and to regulate the speed of said variable speed means between its complete limits during each of said intervals.

VERNON KINSER.